Patented Mar. 23, 1937

2,074,380

UNITED STATES PATENT OFFICE 2,074,380

ANTIFOAMING AGENTS

Lawrence H. Flett, Hamburg, N. Y., assignor to National Aniline & Chemical Company, Inc., New York, N. Y., a corporation of New York No Drawing. Application March 8, 1935, Serial No. 10,033

18 Claims. (Cl. 8—6)

This invention relates to the suppression of foaming or frothing of liquid compositions. It is in particular directed to incorporating in dye baths, dye pastes, discharge pastes, and other textile treatment compositions, an agent which inhibits foaming or frothing and makes possible more uniform treatment of the textiles. It will be understood that by liquid compositions I mean to include such viscous liquids as the dye pastes and discharge pastes encountered in the textile treatment art as well as the more mobile liquids such as dye baths.

Normally compositions prepared from certain dyes, discharges, or other materials may tend to foam or froth when the composition is agitated, as while the material is being worked or the paste is being mixed. This froth, coming in contact with the textile material, causes non-uniform contact of the solution and hence unequal and irregular treatment of the textile material.

I have found that by introducing into such a treatment composition a small quantity, say 1% to 2%, or even less, of triamylamine, the foaming or frothing may be largely or completely inhibited. Other amines also possess this valuable property. The general class of compounds within the purview of the present invention are water-insoluble or only sparingly soluble amines (designated collectively in the claims as amines substantially insoluble in water) which exist as liquids under the conditions of use and which are represented by the formula

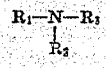

wherein $R_1$ denotes an alkyl, aryl, or aralkyl group, and $R_2$ and $R_3$ each denotes hydrogen, an alkyl group, or an aralkyl group, and the alkyl, aryl, and aralkyl groups each may contain one or more substitutents. The primary, secondary, and tertiary non-substituted aliphatic amines are superior in their effects and are considered the preferred embodiment of applicant's invention. The di- and trialkyl amines, containing up to 8 carbon atoms in each alkyl group are especially valuable.

Examples of suitable amines are dibutylamine, diamylamine, caprylamine, tricaprylamine, dihexylamine, dimethylaniline, dibenzylamine, N-di-n-butyl-propanolamine, hydroxyethylaniline, 2-phenoxyethyl-amine, N-2-phenoxyethyl-N-methyl amine, N-2(o-methylphenoxy)ethyl-N-methyl-amine, and N-2(o-chlorphenoxy)ethyl-N-ethyl-amine. The amine should be present in the aqueous liquid in the form of the free amine. However, an amine salt, for instance the sulfuric acid salt, may be added to those compositions which, upon addition to water, will convert the salt to the free amine. Likewise, such amine salts may be added as defoaming agents to aqueous solutions which will convert the salt at least in part to the free amine. Normally, an alkaline solution will have this effect.

The following examples illustrate the invention. Parts are by weight.

*Example I.*—A vat dye powder is prepared by thoroughly mixing the following constituents, evaporating off water, and then grinding the residue:

| | Parts |
|---|---|
| National Vat Orange R (C. I. 1217) in the form of an aqueous paste containing 11% of dyestuff | 200 |
| Leukanol (a condensation product of a naphthalene sulfonic acid and formaldehyde) | 4 |
| Sodium naphthalene-2-sulfonate | 2 |
| Cane sugar | 46 |
| Sodium-isobutyl-sulfate | 125 |
| Triamylamine | 1 |

The resultant dye powder may be made into a printing paste without the production of any substantial quantity of foam. A smooth paste capable of yielding full-strength prints of uniform shade is formed. Printed on textile fabric, it yields a very brilliant orange.

*Example II.*—A starch-gum-tragacanth mixture (A) is prepared by mixing

| | Parts |
|---|---|
| Corn starch | 1 |
| British gum | 3 |
| Tragacanth mixture containing 5% gum-tragacanth and 95% water | 1 |
| Water | 10 |

A reducing paste (B) is then prepared by mixing

| | Parts |
|---|---|
| Gum-tragacanth mixture (A) | 52 |
| Potassium carbonate, $K_2CO_3$ | 15 |
| Water | 16 |
| Sodium formaldehyde-sulfoxylate | 12 |
| Glycerine | 5 |

A vat printing paste is now made up of

| | Parts |
|---|---|
| National Vat Orange R, 11% strength | 200 |
| Triamylamine | 5 |
| Reducing paste (B) | 795 |

The printing paste thus prepared may be used for printing textiles in the usual manner without substantial foaming.

The National Vat Orange R used in the above examples ordinarily tends to foam and thus causes considerable difficulty in applying it uniformly to the fiber. By the use of triamylamine or another of the above-mentioned amines in the manner of the preceding examples, this difficulty is substantially completely avoided.

*Example III.*—An acid color printing paste is prepared of the following constituents:

| | Parts |
|---|---|
| Wool Orange A (C. I. 151) | 10 |
| Water | 60 |
| Alcohol | 10 |
| 1:1 solution of British gum in water | 119 |
| Triamylamine | 1 |

Substantially no foaming or frothing takes place in the mixing or application of this dye paste and it may be applied in the usual manner for printing textiles, yielding full-strength prints of excellent uniformity.

*Example IV.*—A pigment printing paste may be prepared by mixing

| | Parts |
|---|---|
| Ultramarine Blue (C. I. 1290) | 50 |
| Solution consisting of 25 parts albumen in 25 parts water | 50 |
| Glycerine | 6 |
| Gum tragacanth mixture containing 5% gum tragacanth and 95% water | 93 |
| Triamylamine | 1 |

This printing paste may be made up by suitably mixing the ingredients and may be applied as in the preceding examples without formation of froth or foam.

*Example V.*—A discharge is prepared by mixing

| | Parts |
|---|---|
| Zinc oxide paste (containing 5 parts ZnO and 5 parts water) | 10 |
| Triamylamine | 1 |
| Reducing mixture containing 16% egg albumen 54% water 16% sodium hydrosulfite 14% gum tragacanth mixture containing 5% gum tragacanth and 95% water | 20 |

The printing paste obtained by uniform admixture of these constituents comprises substantially no foam and may be applied in the customary manner.

*Example VI.*—A printing paste is prepared by mixing

| | Parts |
|---|---|
| Orange GC salt (the zinc chloride double salt of 3-chloraniline diazonium chloride) | 8 |
| Water | 62 |
| Neutral starch tragacanth mixture containing 7% wheat starch 43% gum tragacanth thickener, 5% strength 50% water | 129 |
| Triamylamine | 1 |

The paste thus prepared may be applied to fabrics and developed in the usual manner for printing fast shades, without foaming or frothing.

*Example VII.*—A nitrosamine printing paste is prepared by mixing

| | Parts |
|---|---|
| Sodium salt of 2,3-hydroxynaphthanilide | 3.8 |
| Alcohol | 5 |
| Water | 24 |
| Sodium dianisidine nitrosamine | 2.2 |
| Neutral starch tragacanth mixture (see Example VI) | 64.5 |
| Triamylamine | 0.5 |

The paste may be applied as in the preceding examples.

*Example VIII.*—A nitrosamine printing paste is made up of

| | Parts |
|---|---|
| Sodium salt of 2,3-hydroxynaphthoic-o-toluidide | 3.6 |
| Sodium metachlornitrosaniline | 2.4 |
| Alcohol | 5 |
| Water | 24 |
| Neutral starch tragacanth mixture (see Example VI) | 64.6 |
| Triamylamine | 0.4 |

*Example IX.*—An aqueous solution containing 0.2% of Gardinol W. A. (a mixture of alkyl sulfates of aliphatic alcohols containing 12–18 carbon atoms) is shaken for a short time whereby a considerable layer of foam is produced. Upon the addition of 0.02% of diamylamine to this foaming mixture, the foam rapidly subsides and disappears within a short time.

If the diamylamine is added to a solution containing such a dispersing agent and the mixture is then shaken, substantially no foam is formed. In a similar manner, the foaming of solutions of soap, shellac, dextrine, sulfates and sulfonates of the higher alcohols, aromatic sulfonates, and other foam producing substances may be prevented. The addition of ½ of one per cent of triamylamine to a dry diazo salt will prevent formation of foam upon dissolving the salt in water or upon preparing printing pastes from it.

The terms "alkyl", "aryl", or "aralkyl" as used in the claims are intended to include groups containing substituents, —OH for example, as well as unsubstituted groups. The term "alkyl group" is intended to include cycloalkyl as well as straight and branched chain alkyl groups.

I claim:

1. The method of inhibiting the foaming of an aqueous liquid having a tendency to foam, which comprises incorporating therewith a small quantity of a liquid amine substantially insoluble in water and having the following general formula

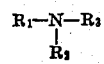

wherein $R_1$ represents an alkyl, aryl, or aralkyl group, and $R_2$ and $R_3$ each represents hydrogen, an alkyl group, or an aralkyl group.

2. In applying to textile fibers an aqueous liquid composition containing a constituent that tends to produce foam, the improvement which comprises incorporating in said composition a liquid amine substantially insoluble in water and having the following general formula

wherein $R_1$ denotes an alkyl, aryl, or aralkyl group, and $R_2$ and $R_3$ each represents hydrogen, an alkyl group, or an aralkyl group.

3. In applying to textile fibers a liquid composition containing a constituent that tends to produce foam, the improvement which comprises incorporating in said composition a liquid polyalkylamine substantially insoluble in water.

4. The method of inhibiting the foaming of an aqueous solution which comprises maintaining in the solution a small quantity of a polyamylamine.

5. In applying to textile fibers an aqueous liquid composition containing a constituent that tends to produce foam, the improvement which comprises incorporating in said composition triamylamine.

6. In the process of dyeing a textile fabric with a dye that tends to produce foam, the step which comprises applying to the fabric a dye paste comprising said dye and containing a small proportion of a polyamylamine.

7. In the process of dyeing a textile fabric with a vat dye that tends to produce foam, the step which comprises applying to the fabric a vat dye paste comprising said vat dye and containing a small proportion of triamylamine.

8. An aqueous dye paste comprising a dyestuff and a small proportion of a liquid amine substantially insoluble in water and having the following general formula

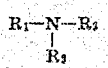

wherein $R_1$ denotes an alkyl, aryl, or aralkyl group, and $R_2$ and $R_3$ each represents hydrogen, an alkyl group, or an aralkyl group.

9. An aqueous dye paste comprising a dyestuff that tends to produce foam, and a polyamylamine.

10. An aqueous vat dye paste comprising a vat dye that tends to produce foam and a small proportion of triamylamine.

11. An aqueous textile treatment bath containing as an antifoaming agent a liquid amine substantially insoluble in water and having the following general formula

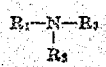

wherein $R_1$ denotes an alkyl, aryl, or aralkyl group, and $R_2$ and $R_3$ each represents hydrogen, an alkyl group, or an aralkyl group.

12. An aqueous textile treatment batch containing as an anitfoaming agent triamylamine.

13. A dye powder comprising a dyestuff and a small proportion of a liquid amine substantially insoluble in water and having the following general formula

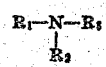

wherein $R_1$ denotes an alkyl, aryl, or aralkyl group, and $R_2$ and $R_3$ each represents hydrogen, an alkyl group, or an aralkyl group.

14. A dye powder comprising a dyestuff that tends to produce foam, and a small proportion of triamylamine.

15. The method of inhibiting the foaming of a liquid having a tendency to foam, which comprises incorporating therewith a small quantity of a liquid polyalkylamine substantially insoluble in water.

16. An aqueous dye paste comprising a dyestuff and a small proportion of a liquid polyalkylamine substantially insoluble in water.

17. An aqueous textile treatment bath containing as an antifoaming agent a liquid polyalkylamine substantially insoluble in water.

18. A dye powder comprising a dyestuff and a small proportion of a liquid polyalkylamine substantially insoluble in water.

LAWRENCE H. FLETT.